W. C. RASTETTER.
STEERING WHEEL RIM.
APPLICATION FILED MAR. 14, 1912.
1,040,013.
Patented Oct. 1, 1912.
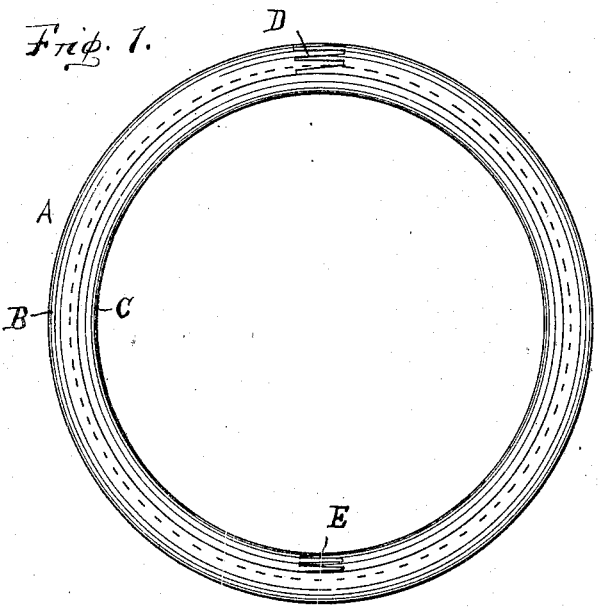
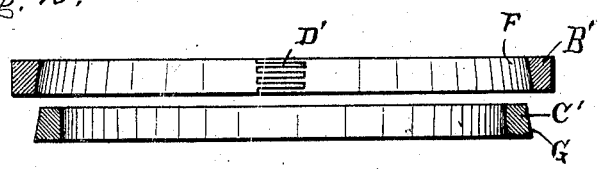
WITNESSES:
William C Rastetter INVENTOR
ATTORNEY

UNITED STATES PATENT OFFICE.

WILLIAM C. RASTETTER, OF FORT WAYNE, INDIANA.

STEERING-WHEEL RIM.

1,040,013.  Specification of Letters Patent.  Patented Oct. 1, 1912.

Application filed March 14, 1912. Serial No. 683,857.

*To all whom it may concern:*

Be it known that I, WILLIAM C. RASTETTER, a citizen of the United States of America, and resident of Fort Wayne, in the county of Allen and State of Indiana, have invented certain new and useful Improvements in Steering-Wheel Rims, of which the following is a specification.

This invention relates to improvements in steering wheel rims, and the object thereof is to afford a method of constructing rims of this class which will facilitate the manufacture of the same when composed of numerous pieces, the invention pertaining particularly to uniting the pieces of which the rim is composed.

The object of the invention is accomplished by the construction illustrated in the accompanying drawings in which:—

Figure 1 is a plan of a rim complete; Fig. 2 is a cross section of the inner and outer rims which are to be united to form the stock out of which the finished product is to be made; and Fig. 3 is a cross-section of a finished rim.

Similar characters of reference refer to corresponding parts throughout the several views and referring now to the same:—A is the rim proper composed of an outer rim B and inner rim C which are united together. Each of the rims B and C are bent into a circle, the ends of the piece of which each is composed being jointed as shown at D and E respectively.

In Fig. 2 is shown the rims B' and C' as they are formed of material preparatory to being joined together and finished. The rim B' has a slanting inner face F and the inner rim C' has a corresponding slanting outer face G, the diameter of the inner rim being so proportioned to the outer rim that the outer face of the former will conform snugly with the inner face of the latter when the inner rim is pressed into place within the outer rim.

The two rims are first formed of bent wood, and the ends of each piece are jointed as shown at D'. After said faces on the rims have been properly slanted, glue is applied in a suitable manner to said faces, and the inner rim pressed tightly within the outer rim, thus forming a composite rim of the two rims B' and C'. With the stock thus formed, a suitable finishing operation is applied to form the stock into a rim as shown in Figs 1 and 3.

Having described my invention what I claim as new and desire to secure by Letters Patent is:—

The method of making a steering wheel rim which consists in forming a stock of two bent wood rims, the ends being jointed, the outer face of one rim being beveled and the inner face of the other rim being correspondingly beveled, the two rims being secured together with a glued joint, the inner rim being pressed within the outer rim, and subsequently shaping the stock by a finishing operation.

In testimony whereof I affix my signature, in presence of two witnesses.

WILLIAM C. RASTETTER.

Witnesses:
 MATHILDA METTLER,
 W. C. BURNS.